(12) United States Patent
Morand et al.

(10) Patent No.: US 8,374,187 B2
(45) Date of Patent: Feb. 12, 2013

(54) METHOD AND SYSTEM FOR LOCALISING USERS FOR SERVICES BASED ON SIP OR H.323 PROTOCOLS WITH DYNAMIC IP ADDRESS ALLOCATION

(75) Inventors: Lionel Morand, Malakoff (FR); Frederic Delmond, Paris (FR)

(73) Assignee: France Telecom, Paris (FR)

( * ) Notice: Subject to any disclaimer, the term of this patent is extended or adjusted under 35 U.S.C. 154(b) by 366 days.

(21) Appl. No.: 11/660,919

(22) PCT Filed: Aug. 18, 2005

(86) PCT No.: PCT/FR2005/002099
§ 371 (c)(1),
(2), (4) Date: Feb. 23, 2007

(87) PCT Pub. No.: WO2006/024791
PCT Pub. Date: Mar. 9, 2006

(65) Prior Publication Data
US 2009/0034536 A1    Feb. 5, 2009

(30) Foreign Application Priority Data
Aug. 25, 2004    (FR) ...................................... 04 09085

(51) Int. Cl.
*H04L 12/28*    (2006.01)
*H04L 12/56*    (2006.01)
(52) U.S. Cl. ................... 370/395.54; 370/351; 370/389; 370/392
(58) Field of Classification Search .................... None
See application file for complete search history.

(56) References Cited

U.S. PATENT DOCUMENTS

| 6,650,902 | B1 |   | 11/2003 | Schuster et al. |
|---|---|---|---|---|
| 7,139,818 | B1 | * | 11/2006 | Kinnear et al. ............... 709/222 |
| 2004/0071164 | A1 | * | 4/2004 | Baum ........................... 370/469 |
| 2004/0073600 | A1 | * | 4/2004 | Elo et al. ....................... 709/201 |
| 2005/0027868 | A1 | * | 2/2005 | Dodson et al. ................ 709/227 |
| 2005/0177616 | A1 | * | 8/2005 | Addington et al. ........... 709/203 |

FOREIGN PATENT DOCUMENTS
EP    1355448 A    10/2003

OTHER PUBLICATIONS

N. Abbott, "Alternatives for providing routing and location information to support emergency calling from IP enterprises", Internet Article, 'Online!, Oct. 3, 2003, pp. 1-16, XP00232684.
MD Lewis, "Location Determination Technologies", Internet Article, 'Online!, Oct. 3, 2003, pp. 1-26, XP00232685.
J. Polk et al., "Dynamic Host Configuration Protocol Option for Location Configuration Information for Geopriv", Internet Draft, Aug. 21, 2003, pp. 1-15, XP015001903.
M. Patrick, "RFC 3046: DHCP Relay Agent Information Option", Internet Article, Jan. 2001, pp. 1-15, XP015008829. R. Droms: "RFC 2131: Dynamic Host Configuration Protocol", Internet Article, Mar. 1997, pp. 1-46, XP015007915.

* cited by examiner

*Primary Examiner* — Jae Y Lee
(74) *Attorney, Agent, or Firm* — Miles & Stockbridge PC

(57)    ABSTRACT

The aim of the invention is to localise a terminal (10) when accessing an IP service (15), by means of an access network (1, 2). To this end, a method for allocating an IP address to the terminal (10) is carried out, a database (8) memorises the IP address allocated to the terminal (10) in association with a terminal or user identifier and an identifier of an access point wherein the terminal accesses the access network (1, 2), the access point being associated with localisation information, and the database transmits the localisation information associated with the identifier of the terminal or the user to the service.

11 Claims, 5 Drawing Sheets

METHOD AND SYSTEM FOR LOCALISING USERS FOR SERVICES BASED ON SIP OR H.323 PROTOCOLS WITH DYNAMIC IP ADDRESS ALLOCATION

This invention relates to the deployment of architectures providing IP (Internet Protocol) Multimedia services, such as telephony over IP, real-time video or multimedia instant messaging services.

Such architectures are generally based on the implementation of IP session initiation and control protocols such as SIP (Session Initiation Protocol) or H.323 (Packet-Based Multimedia Communications Systems), as well as on the DHCP protocol (Dynamic Host Configuration Protocol) for dynamic IF address allocation to the user.

By connecting to a wired or wireless network providing an IP connection, the user obtains an IP address from a DHCP server enabling him to route its IP traffic and to use IP signaling protocols such as SIP or H.323. The user then uses an SIP or H.323 client installed on its terminal in order to register with a call server (SIP or H.323 Gatekeeper Server), for the purpose of accessing a service platform offering multimedia services over IP. Once registered, the user can, in particular, initiate or receive voice calls over IP.

Remote access procedures enable a user to move about and to locate the multimedia services to which he subscribes, and this is so regardless of the access network used, provided there is agreement between the various actors (access network provider, Internet access provider, IP services provider, etc.).

It turns out that the execution of certain services requires knowledge of the geographic or network location, either of the calling user, or of the user being called. This information is particularly essential in the following cases.

Calls to an emergency service must be routed to the emergency response center closest to the caller, which requires that the location of the caller be known with certainty.

In addition, a number of value-added services exploit the geographic and/or network location of the user in order to adapt the routing of incoming or outgoing calls, or the service offered to the user, based on the location.

The basic principles used in architectures for providing IP multimedia services, based on the SIP or H.323 protocol, are shown in FIG. 2.

The user terminal 10 is equipped with an access network interface enabling it to connect to an IP network via an access server 3. This connection can also be made subject to an authentication 21 of the terminal and/or of the user by the access network.

From the moment when the terminal has access to the services offered by the access network, the terminal implements mechanisms provided by the DHCP protocol in order to obtain an IP address and to discover 22 the information required to configure the terminal accessing the IP transport layer (address of the DNS server—Domain Name Server—, IP address allocation lease period, etc.). At the end of this procedure, the terminal is assigned 23 an IP address.

Once the IP address has been retrieved, the SIP or H.323 client with which the terminal 10 is equipped sends a registration request 25 to a service platform call server 16. This registration can also be made subject to an authentication 24 of the terminal and/or of the user at the service platform level.

Once the registration has been carried out, the user is recognized by the platform service as active, which gives him the possibility of sending and receiving calls, as well as initiating multimedia sessions 26.

Signaling protocols such as SIP and H.323 by nature support mobile users. These protocols implement a registration procedure enabling any user to register from any terminal and access network, under the condition, of course, that the user has sufficient rights. The service platform and the associated applications then have the IP address of the user and thereby know their connectivity status.

However, in an access network not having any mobility management mechanism, no procedure exists for enabling the service platforms based on the SIP or H.323 protocol to dynamically retrieve from the access network the geographic or network location information of the user (address of the equipment managing the IP traffic of the user). As a matter of fact, the service platform knows only the identity of the user and its IP address, which is insufficient to locate him accurately and reliably. In certain particular situations, it is possible to use IP address resolution in order to determine the network to which an IP address has been assigned. However, the IP address is a piece of information too unreliable for certifying the location of a user. For example, in the absence of any "anti-spoofing" mechanism (IP address anti-theft mechanism), it is easy for a malicious person to steal the IP address of a terminal connected to the IP network by means of a radio interface. Furthermore, in the case where the IP address assigned by the DHCP procedure belongs to a private IP network, and when a NAT (Network Address Translator) function is implemented, the IP address seen by the service platform is a public IP address assigned by the NAT function, and not the private IP address (unknown to the public network), which was assigned to the terminal for the access in progress. Thus, the IP address does not correspond to the one used by the user's terminal or by the equipment to which the terminal is connected.

It is possible to envisage requesting the user to provide this location information. However, since this involves a declarative mode, the information provided is unreliable. This information can also be made known automatically by the terminal, by means of a geolocating system such as the GPS. However, nowadays, these systems are too popular and expensive.

All things considered, no satisfactory procedure exists to date for enabling a service platform based on the SIP or H.323 protocol to dynamically obtain certified location information about a registered user on a fixed access, in the broad sense of the term, excluding cellular mobile networks.

The purpose of this invention is to eliminate this disadvantage by exploiting the accurate information held by access network operators with respect to the geographic configuration of the points of access to their network, with a view to providing reliable and accurate information about the network and geographic location of a terminal from which a user registers. This objective is achieved by providing a method for locating a user terminal via an IP service to which the terminal can gain access by means of an access network, comprising the execution of a procedure for allocating an IP address to the terminal, during the course of which an IP address is assigned to the terminal.

Furthermore, a database stores the IP address assigned to the terminal, in association with a terminal or user identifier and an identifier for a point of access of the terminal to the access network, the point of access being associated with location information, and the database transmits the location information associated with the terminal or user identifier to the service.

According to one alternative, when the terminal sends an IP address request message to an address server, it inserts the terminal or user identifier in said IP address request message.

According to another alternative, the terminal sends an IP address request message to an address server via an access server, and the access server inserts the point of access identifier into said IP address request message.

According to another alternative, when the terminal accesses the service under a user identifier for the service, the database stores the user identifier for the service in association with the information already associated with the terminal or user identifier, and the service obtains the terminal location information from the user identifier for the service.

According to yet another alternative, the service is automatically notified of the terminal location information in the event of a change in the database.

It is further possible to provide for the terminal or user identifier to be a random number generated by the terminal.

According to one alternative, the database obtains the terminal location information from an information system of a network access and IP transport operator, with the aid of the point of access identifier.

The invention also deals with a database accessible to at least on IP service for locating a user terminal connected to an IP transport network via an access network, designed to:
- store, for a given user terminal, an IP address assigned to the terminal in association with a terminal or user identifier and an identifier for a point of access of the terminal to the access network, the point of access being associated with location information for the terminal, and
- transmit to the service location information associated with the terminal or user identifier.

According to one alternative, the database is designed to send a request to locate a user to an information system of an access and IP transport network operator, said request containing an identifier for the point of access through which the terminal is connected to the access network.

The invention further deals with an IP address server for an IP transport network to which at least one access network is connected, comprising means for assigning an IP address to a to the terminal in order for it access the IP transport network, and means for receiving an IP address request sent by the terminal during it access to an IP service, the IP address server further comprising:
- means for extracting from the IP address request an identifier for the terminal and an identifier for the point of access of the terminal to the access network, and
- means for updating a database with said information extracted from the IP address request, in association with an IP address assigned to the terminal.

The invention also deals with an access server intended to be connected to an access network and to an IP transport network, in order to enable a terminal to access an IP service via the access network and the transport network, the access server comprising means for receiving and forwarding to an IP address server an IP address request sent by a user terminal, means for inserting into the IP address request received an identifier for the point of access of the terminal to the access network, prior to forwarding the request to the IP address server.

The invention further deals with a terminal for accessing at least one IP service via an access network and an IP transport network, comprising means for sending an IP address request to an IP address server and means for inserting into said request a terminal or user identifier.

According to an alternative of the terminal, means are provided for generating a random number used as the terminal identifier.

A preferred embodiment of the invention will be described below, for non-limiting, illustrative purposes, with reference to the appended drawings in which.

Figure 3:
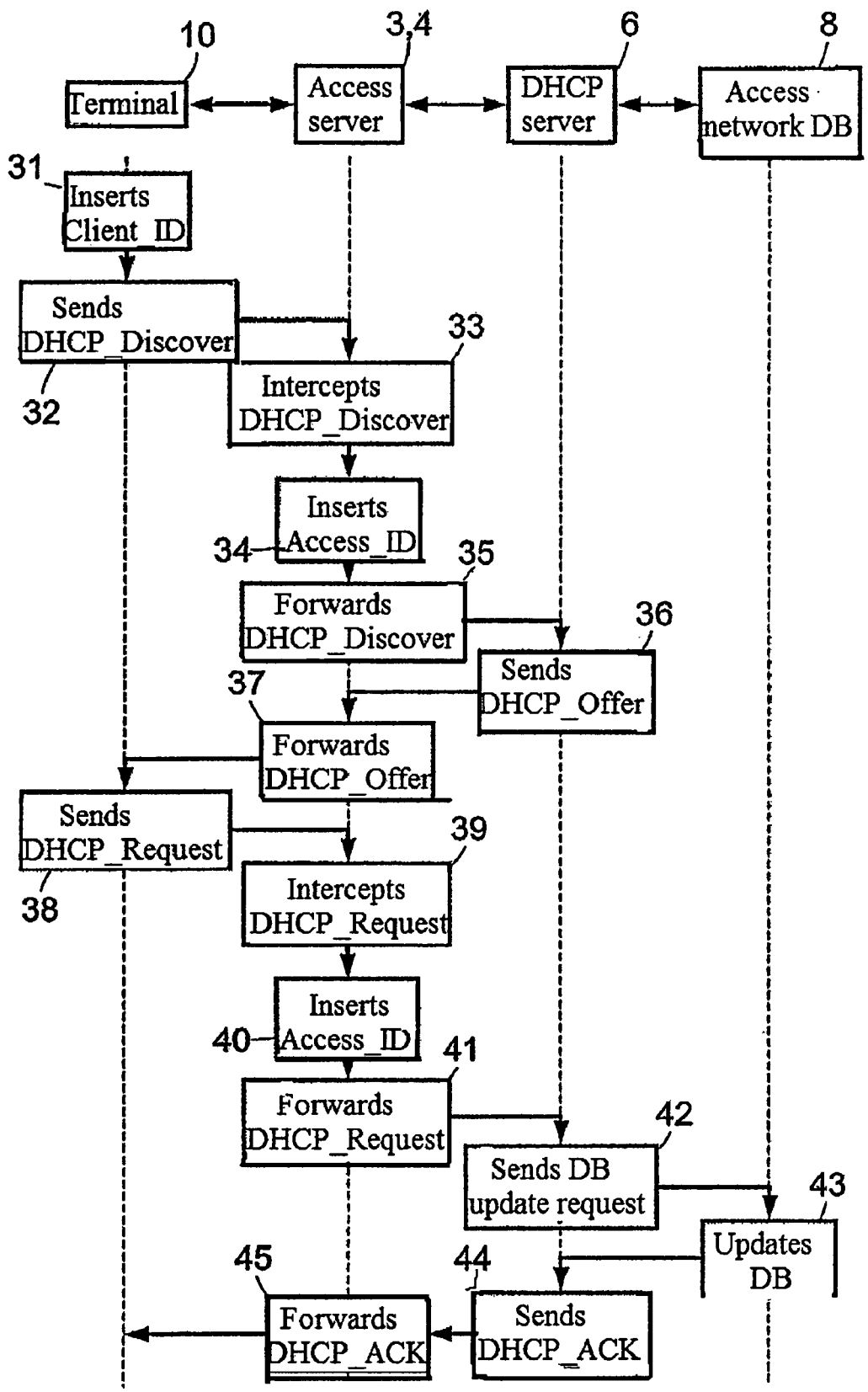
Figure 4:
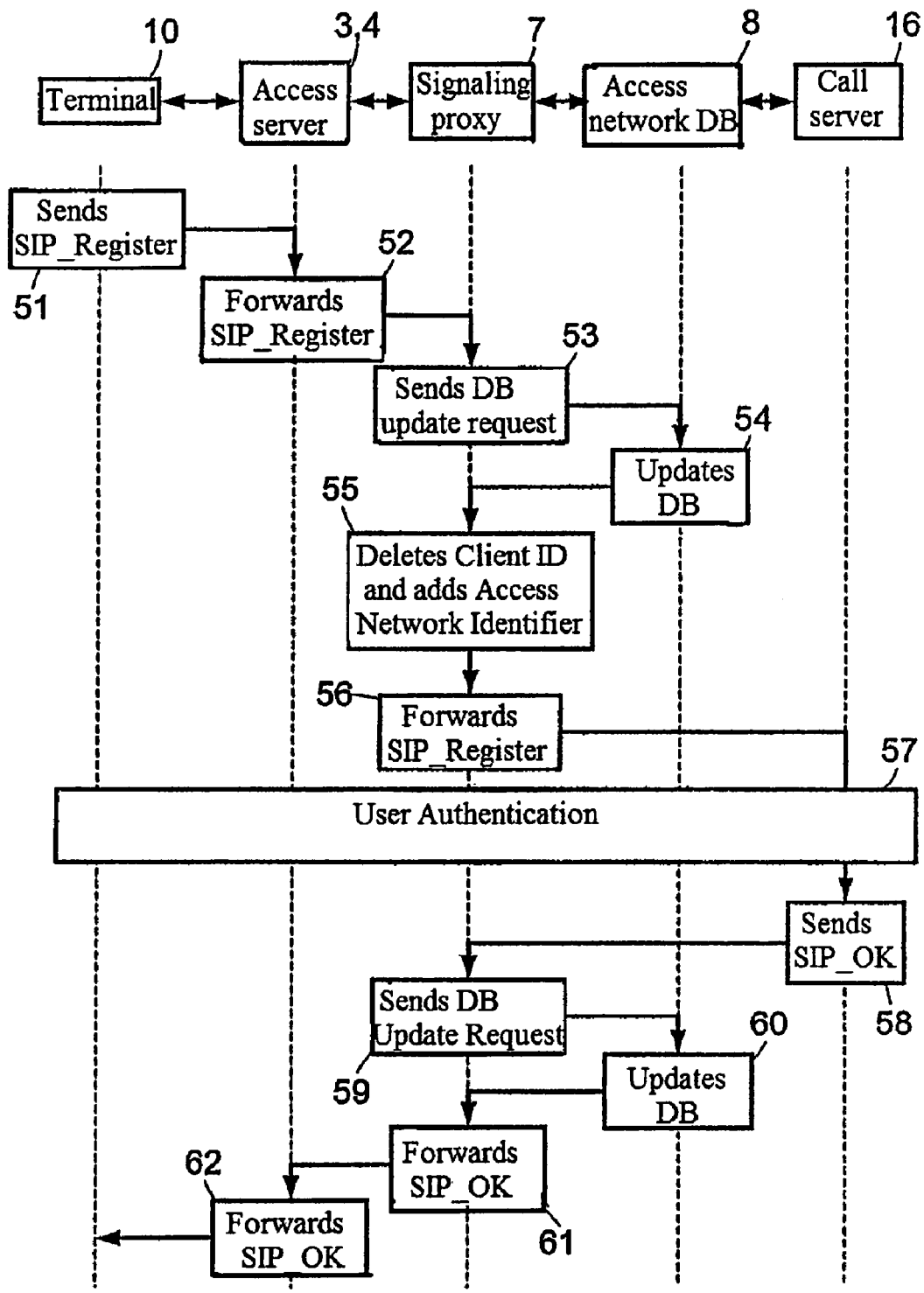
Figure 5:
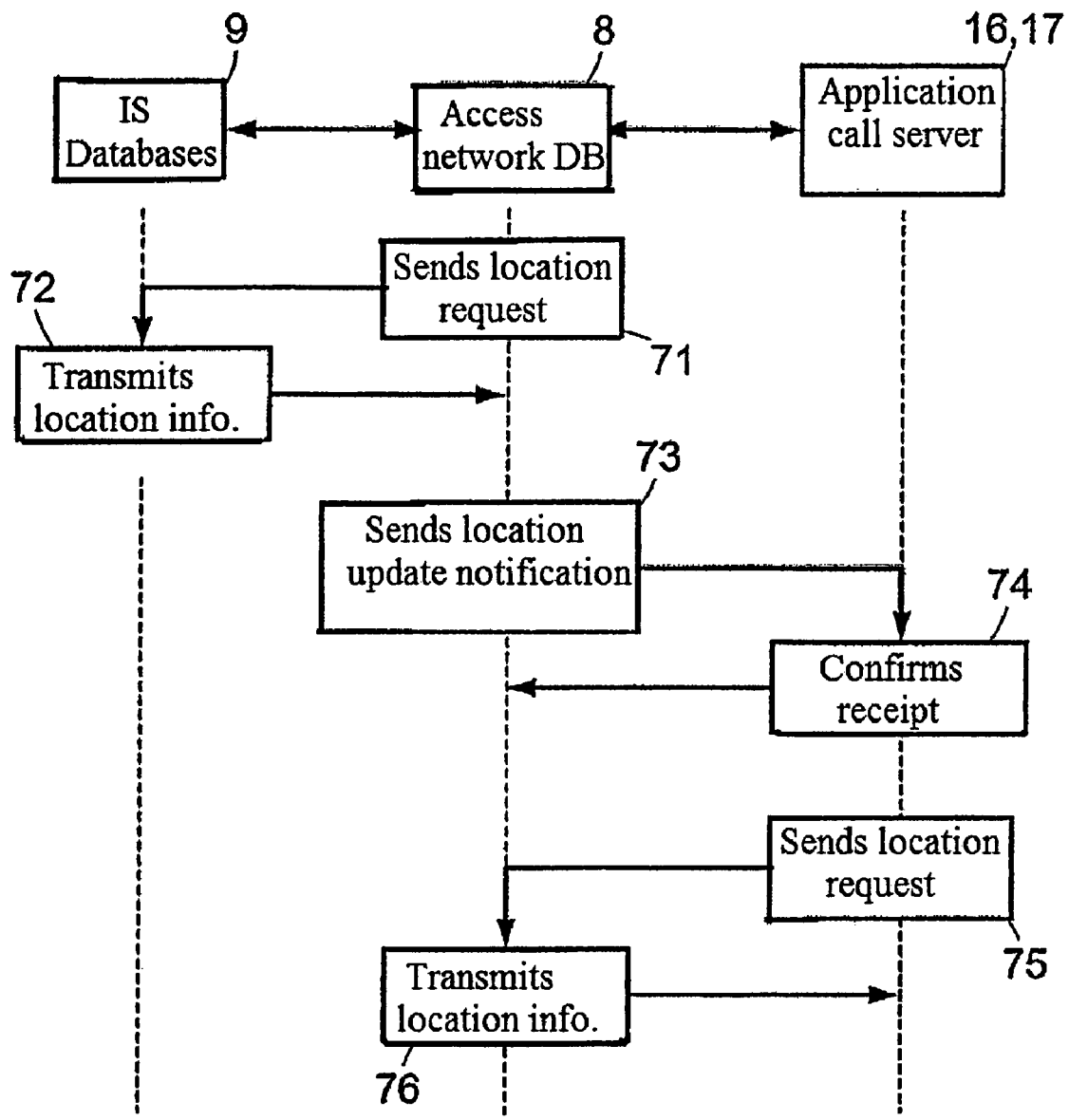

FIG. 3, in the form of a flow chart, shows a procedure according to the invention for a dynamic IP address assignment during an attempt by a user terminal to access an IP multimedia service;

FIG. 4, in the form of a flow chart, shows a procedure for registering a user with an IP multimedia service, according to the invention;

FIG. 5, in the form of a flow chart, shows several procedures for obtaining location information for a user.

Figure 1:
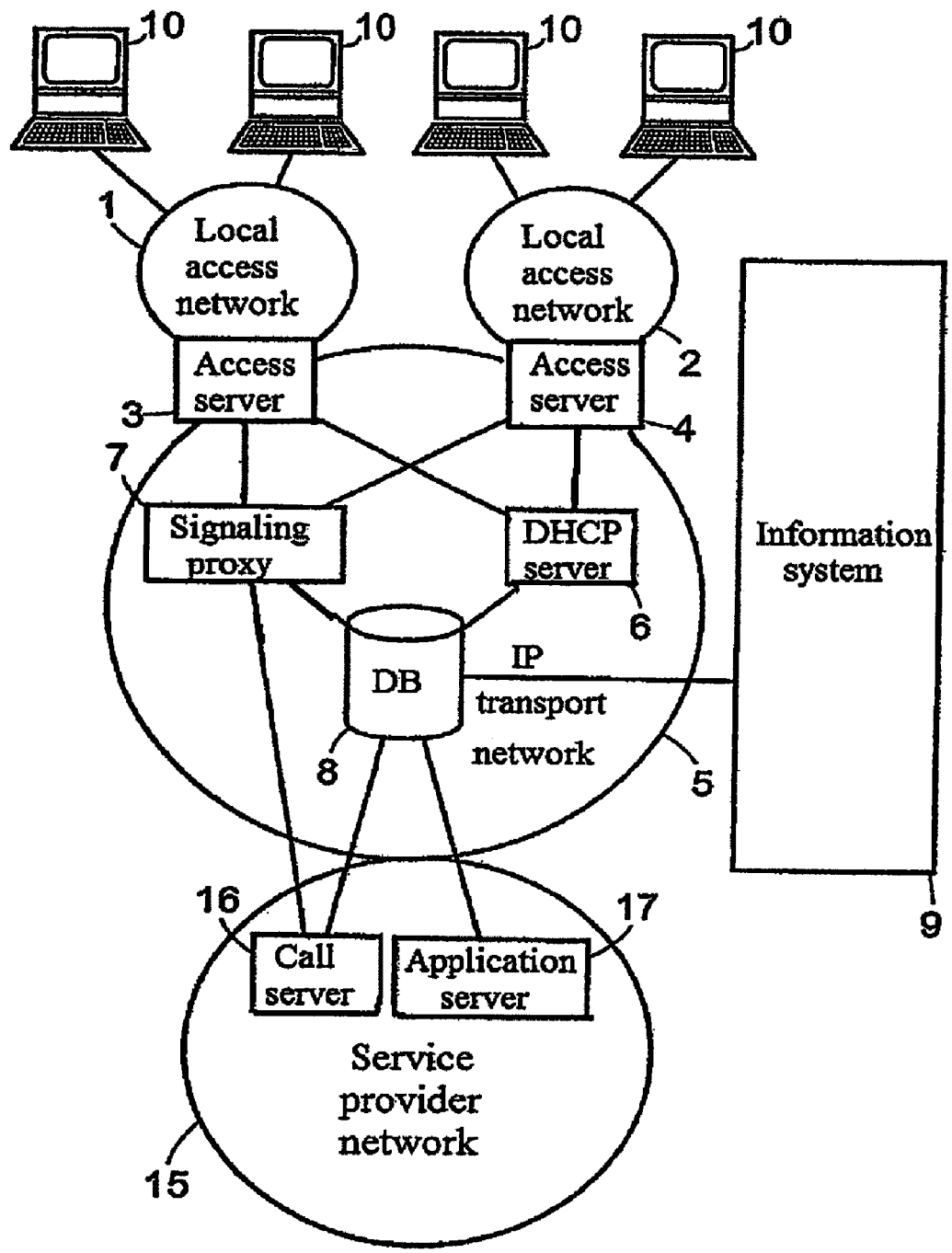
FIG. 1 is a schematic representation of a system for accessing services based on the SIP or H.323 signaling protocols.
Figure 2:
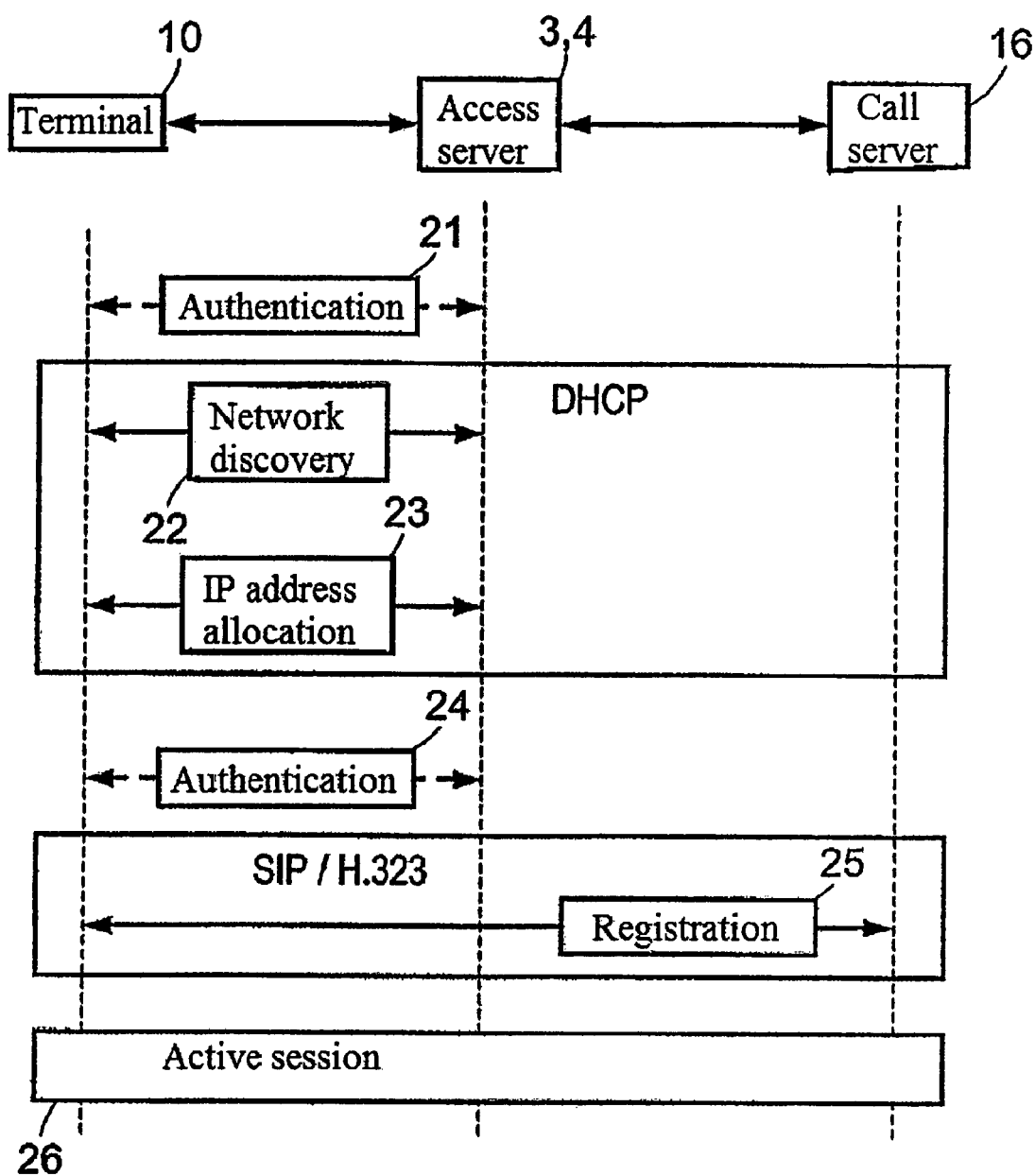
FIG. 2 is a schematic representation of a generic diagram for accessing multimedia services based on the SIP or H.323 protocols, according to the prior art.

FIG. 1 shows a system enabling users equipped with terminals 10 to access IP multimedia services, whose session control is based on the SIP or H.323 signaling protocol.

Such services are generally provided by service platforms including a call server 16 and an application server 17, the platforms being hosted in the IP network 15 of the service provider. In order to access such service platforms, the user equipped with a terminal 10 must have access to a core or IP transport network 5, via an access network 1, 2 and an access server 3, 4.

The IP transport network 5 includes a DHCP server 6 and a signaling proxy 7 connected to the access servers, the DHCP server participating in the dynamic assignment of IP address in order to provide the user terminals with access to the transport network 5.

In order to enable service platforms based on the SIP or H.323 protocol to obtain location information for a user, which is certified by an operator, from the moment the user registers, then at any moment when the user has an IP address, the invention proposes, in particular, to convey an identifier for a user or for the terminal of said user, during the procedures executed by the user's terminal connected to the access network 1, 2, in order to access a service offered by an IP multimedia service platform based on the SIP or H.323 protocol, and in particular during the DHCP procedure for allocating an IP address to the user, and the procedure for registering the user with the service platform.

For this purpose, the access 1, 2 and IP transport 5 networks according to the invention include a database 8 accessible to the access servers 3, 4, to the DHCP server 6 and to the signaling proxy 7, this database ensuring correlation between the data for the users connected to the access network 1, 2, i.e., for each user, the identity of the user and the IP address that was assigned to him for the connection, this database being updated through the IP transport network via the access server 3, 4, the DHCP server 6 and the signaling proxy 7, and being read-accessible to the service platforms. Furthermore, the database 8 provides information about the access network 1, 2 characteristics and about the geographic location of its various components and, in particular, the points of access to which the user terminals are connected, this information being obtained in advance from an information system 9 of the operator of the access networks 1, 2.

In a first phase, the user or terminal identifier that is conveyed during access to an IP multimedia service is used in the address allocation procedure by the DHCP 6 server, at the access network level, so that it is associated with the IP address assigned to the terminal 10 by the DHCP server. The IP address assigned and the user or terminal identifier are stored in the database 8, in association with the physical coordinates for the physical point of access to which the user terminal 10 is connected. The database 8 then makes it possible to determine the geographic coordinates for this physical point of access.

In a second phase, the user or terminal identifier is transmitted to the signaling proxy 7 during the procedure for registering the user with the service platform. This arrangement enables the signaling proxy to update the database 8 with the service identity under which the user accesses the service. The procedure for registering the user with the service platform is standard. The user registers using its service identity. Once the registration has succeeded, the service platform can obtain the location information from the database 8 that is associated with the service identity registered by the user. This location information can be obtained either in consultation mode or in notification mode. In consultation mode, the service platform transmits to the database 8 a request dealing with the location information corresponding to the service identity of the user. In notification mode, the service platform is dynamically notified of this location information by the database 8.

FIG. 3 shows the procedure according to the invention, for IP address allocation via the DHCP server.

In the first step 31 of this procedure, the user terminal 10 inserts a "Client-ID" user or terminal identifier serving as a correlation parameter in a DHCP_Discover request to be sent to the DHCP server 6, the terminal being equipped with an interface for this purpose. The "Client-ID" identifier, for example, is inserted into the "client-identifier" field (option code 61) of the DHCP messages.

In the next step 32, the DHCP_Discover message is disseminated to the access network 1, 2, to which the user terminal 10 is connected, with a destination of the DHCP server 6, this message containing the MAC address of the network interface card of the terminal ("chaddr" parameter), an identifier for the transaction ("xid" parameter) and the "Client-ID" parameter.

In the next step 33, this message is intercepted by the access server 3, 4 for the user's access network 1, 2, the access server then acting as a DHCP relay by storing the MAC address and "Client-ID" identifier contained in the message. In the following step 34, the access server inserts into the intercepted message an "Access-ID" identifier for the line to which the user terminal is connected, e.g., into the "relay agent information" field (option code 82) of the DHCP_Discover message. In the next step 35, the message thus completed is transmitted to the DHCP server 6.

In the next step 36, the DHCP server receives the DHCP_Discover message and sends back to the terminal a DHCP_Offer message containing the proposed IP address for the terminal ("yiaddr" parameter), this IP address being selected from a pool of addresses that can be assigned to the access server 3, 4. In the following step 37, the access server receives this message and forwards it to the user terminal.

Upon receiving this message in step 38, the user terminal sends a DHCP_Request message to the DHCP server, in order to request use of the IP address contained in the DHCP_Offer message received. The DHCP_Request message also contains the MAC address ("chaddr") of the network interface card of the terminal, the identifier ("xid") for the transaction, and the "client-identifier" identifier. In step 39, the access server intercepts this message, inserts the "Access-ID" line identifier into it, e.g., into the "relay agent information" field (step 40), and transmits it to the DHCP server 6 (step 41).

In step 42, the DHCP server receives this message, extracts the information contained therein, i.e., the IP address assigned to the terminal, the "Client-ID" identifier and the "Access-ID" point of access identifier, and sends this information in a request to update the database 8. In step 43, the database receives and stores this information and sends a message confirming that it has been received, in which it possibly provides the address of signaling proxies to be contacted by the user in order to carry out an SIP registration. In step 44, this message is received by the DHCP server, which confirms to the user the right to use the IP address, by sending to the terminal a DHCP_ACK message further containing the authorized period of use for the IP address and possible other information such as addresses of signaling proxies and DNS servers to be used, this information being obtained from the database 8 or stored internally by the DHCP server. In the following step 45, the DHCP_ACK message is relayed by the access server to the user terminal 10.

Once the terminal has an IP address, it can be registered with a service platform, in accordance with the registration procedure shown in FIG. 4. The procedure shown in this figure is compliant with the SIP protocol. A similar procedure can be shown and described in accordance with the H.323 protocol.

In the first step 51 of this procedure, the terminal uses previously received information, i.e., the assigned IP address, the address of the signaling proxy 7 to be used, in order to send a SIP_Register registration message also containing the SIP identifier for the user in the format "User1_Public1@home.com," in the "from" and "to" fields ("home.com" designating the domain of the service requested by the user), as well as the "Client-ID" identifier used as the correlation parameter between the two procedures, the latter being inserted, for example, into the "Digest-Username" parameter of the "Proxy Authorization" field of the SIP message.

In the next step 52, the SIP_Register message is transmitted to the signaling proxy 7 via the access server 3, 4, which is SIP-transparent. In step 53, the signaling proxy receives this message and stores the "Client-ID" identifier in association with the SIP identifier of the user, and forwards this information to the database 8 in an update request message. The "Client-ID" identifier enables the database 8 to store the SIP identifier of the user in association with the other information stored for the user identified by "Client-ID." The database then confirms (step 54) receipt of this information. In the following step 55, the signaling proxy 7 deletes the "proxy-authorization" field containing the "Client-ID" identifier from the SIP-Register message received, and adds to it the "P-Visited-Network-ID" field identifying the access network 1, 2 to which the user terminal is connected. In step 56, the signaling proxy 7 transmits the SIP_Register message thus modified to the call server 16 for the service requested by the user. Upon receiving this message, the call server executes a procedure 57 for authenticating the user. If the user is authorized to access the service, then, in step 58, the call server sends a SIP_OK message of agreement in response to the SIP_Register message received. In the case where the user has several identifiers associated with the registered identifier, the call server indicates, in the "P-Associated-URI" field of the SIP_OK message, that the concerned identities ("User1_Public2@home.com," "User1_Public3@home.com," "User1_Public4@home.com") are implicitly registered.

Upon receiving the SIP_OK message (step 59), the signaling proxy examines the content of the message in order to discover therein the identifiers possibly associated with the registered identifier, and triggers an updating of the database 8 using this information associated with the "Client-ID" identifier, in order to enable the database to complete the stored information relating to the user identified by "Client-ID."

This information is received by the database 8 in step 60, which confirms receipt of it. Upon receiving this information in step 61, the proxy forwards the SIP_OK message to the access server 3, 4, which in turn forwards the message to the terminal in step 62.

The database 8 is capable of finding information relating to the geographic location of a user, e.g., the mailing address of the latter. For this purpose, in a first step 71 of a locating procedure, the database 8 sends a user location request to the information system 9 of the operator of the access and IP transport networks to which the user is connected. This location request contains the Access-ID identifier for the point of access to the network to which the user is connected. In the next step 72, the information system returns the requested information.

In addition, during the course of a user being registered by an IP multimedia service, e.g., upon receipt of the SIP_Register message or after sending the SIP_OK message, the call server 16, or a dedicated application server of the service platform, that has been contacted, for example, at the moment of registration, may require location information (network or geographic) about the user registered under a given identifier.

If the call server 16 or the dedicated application server 17 has previously subscribed to a notification service, the database 8 can automatically notify the call server or the application server of a change in geographic location of the user registered under the identity "User1_Public1@home.com" (step 73). The name of the domain (or network) ("home.com") to which the server in question belongs, makes it possible to correctly route the notification message. Upon receipt of the notification (step 74), the call or dedicated application server confirms receipt of the location information.

If no notification service exists, or if the call 16 or dedicated application 17 server has not subscribed to such a service, the server 16, 17 must then request (step 75) from the database the location information for a user possessing an identifier for the service having the format "User1_Public1@home.com," by transmitting to it a request containing the user identifier. For this purpose, it must previously determine the network and the database 8 to be queried from the "P-visited-network" information transmitted in the SIP_Register message sent by the signaling proxy 7.

On the basis of previously established agreement, the database 8 of the access network to which the user is connected returns the geographic location information associated with the identity of the user to the call 16 or dedicated application 17 server.

For illustrative purposes, the invention can be carried out by implementing the DHCP protocol for allocating IP addresses in a private network, and an NAT (Network Address Translator) function at the service node level, which comprises a DHCP relay. In addition, the interface with the DHCP server 6 can be compliant with the DHCP protocol. The call control protocol adopted can be SIP. In addition, the database 8 of the access server can have two front-ends accessible via the SOAP protocol (Simple Object Access Protocol), one for updating and the other for consulting.

The user identifier that is used to correlate the IP address allocation and registration procedures can be a random number generated by the user terminal. In this case, the database 8 refuses an update request in step 43 if this random number used as an identifier is already used in the database to identify a user. This refusal leads to the refusal of the DHCP IP address allocation request. The terminal must then renew its IP address request with a new random number.

The invention claimed is:

1. A method for enabling a user terminal to be located by an IP service to which the terminal can acquire access via a local access network and an IP transport network, successively, the method comprising:
    storing an IP address assigned to the terminal, in association with a terminal or user identifier, an identifier for an access point belonging to the local access network, the access point being a device directly connecting the terminal to a line of the local access network, and geographic coordinates that identify physical coordinates of the access point;
    sending a location request from a database server in the IP transport network to an information system of an operator of the local access network, said location request including the identifier for the access point;
    receiving, at the database server, in response to said location request to the information system, geographic coordinates associated with the access point from the information system; and
    transmitting to a server associated with the IP service the geographic coordinates associated with the access point.

2. The method of claim 1, wherein, when the terminal sends an IP address request message to an address server, the terminal inserts the terminal or user identifier into the IP address request message.

3. The method of claim 1, wherein, when the terminal sends an IP address request message to an address server, via an access server, the access server inserts the identifier for the access point into the IP address request message.

4. The method of claim 1,
    wherein, when the terminal accesses the IP service under a user identifier for the IP service, the database server stores the user identifier for the IP service in association with the information already associated with the terminal or user identifier, and
    wherein the database server transmits to the IP service the geographic coordinates based on the user identifier for the IP service.

5. The method of claim 1, wherein the IP service is automatically notified of the geographic coordinates in the event of a change by the database server.

6. The method of claim 1, wherein the terminal or user identifier is a random number generated by the terminal.

7. The method of claim 1, wherein the database server obtains the geographic coordinates from an information system of a network access and IP transport network operator, with the aid of the identifier for the access point.

8. A system having a database server accessible to at least one IP service for locating a user terminal connected to an IP transport network via a local access network and the IP transport network, successively, the database server being adapted to:
    store, for the terminal, an IP address assigned to the terminal in association with a terminal or user identifier, an identifier for an access point belonging to the local access network, the access point being a device directly connecting the terminal to a line of the local access network, and geographic coordinates that identify physical coordinates of the access point;
    send a location request from the database server in the IP transport network to an information system of an operator of said local access network, said location request including the identifier for the access point;

receive, at the database server, in response to the location request to the information system, the geographic coordinates associated with the access point from the information system; and transmit to a server associated with the IP service the geographic coordinates of the access point.

9. The system of claim 8, further being adapted to send a user location request to an information system of an access and IP transport network operator, the request containing the identifier for the access point.

10. An IP address server computer adapted to form a portion of an IP transport network to which at least one local access network is connected, the IP address server computer comprising:
 a processor;
 an IP address assigning module adapted to assign an IP address to a terminal in order for the terminal to access the IP transport network; and
 an IP address request receiving module adapted to receive a request sent by the terminal for access to an IP service, the IP address request receiving module including:
  an IP address extraction module adapted to extract an identifier for the terminal and an identifier for an access point belonging to the local access network from the request, the access point being a device directly connecting the terminal to a line of the local access network, the access point having associated therewith geographic coordinates that identify physical coordinates for the access point, the local access network having an operator with an information system, and
  a database update module adapted to update a database with the information extracted from the IP address request, in association with an IP address assigned to the terminal,
 wherein the information system is adapted to receive from the database server in the IP transport network a location request including the identifier for the access point and to send to the database server, in response to the location request received by the information system, the geographic coordinates associated with the access point, and the database server adapted to transmit to a server associated with the IP service the geographic coordinates of the access point, and
 the IP address assigning module, the IP address request receiving module and the IP address extraction module are executed by the processor.

11. A network comprising:
 a database server accessible to at least one IP service for locating a user terminal connected to an IP transport network via a local access network and the IP transport network, successively, the database server being adapted to:
  store, for the terminal, an IP address assigned to the terminal in association with a terminal or user identifier, an identifier for an access point belonging to the local access network, the access point being a device directly connecting the terminal to a line of the local access network, and geographic coordinates that identify physical coordinates of the access point,
  send a location request from the database server in the IP transport network to an information system of an operator of said local access network, said location request including the identifier for the access point,
  receive, at the database server, in response to the location request to the information system, the geographic coordinates associated with the access point from the information system, and
  transmit to a server associated with the IP service the geographic coordinates of the access point;
 an access server computer including a processor, the access server configured to be connected to the local access network and to the IP transport network in order to enable a terminal to access an IP service via the local access network and the IP transport network, the access server computer including a receiver/forwarder adapted to receive and forward to an IP address server an IP address request sent by the terminal, said receiver/forwarder being adapted to insert into the IP address request received an identifier for an access point belonging to the local access network, prior to forwarding the request to the IP address server, the access point being a device directly connecting the terminal to a line of the local access network;
 an IP address assigner adapted to assign an IP address to the terminal in order for the terminal to access the IP transport network; and
 an IP address request receiver adapted to receive an IP address request sent by the terminal for access to the IP service, the IP address request receiver including:
  an identifier extractor adapted to extract from the IP address request an identifier for the terminal and the identifier for the access point, and
  a database updater adapted to update a database with the information extracted from the IP address request, in association with an IP address assigned to the terminal,
 wherein the IP address assigner, the IP address request receiver and the identifier extractor are executed by the processor.

* * * * *